United States Patent
Wei et al.

(10) Patent No.: US 10,148,936 B2
(45) Date of Patent: Dec. 4, 2018

(54) MULTI-BAND IMAGE SENSOR FOR PROVIDING THREE-DIMENSIONAL COLOR IMAGES

(71) Applicant: OmniVision Technologies, Inc., San Jose, CA (US)

(72) Inventors: Hui Wei, San Jose, CA (US); Changmeng Liu, San Jose, CA (US)

(73) Assignee: OmniVision Technologies, Inc., San Jose, CA (US)

( * ) Notice: Subject to any disclaimer, the term of this patent is extended or adjusted under 35 U.S.C. 154(b) by 194 days.

(21) Appl. No.: 13/932,736

(22) Filed: Jul. 1, 2013

(65) Prior Publication Data
US 2015/0002629 A1 Jan. 1, 2015

(51) Int. Cl.
| | |
|---|---|
| *H04N 13/02* | (2006.01) |
| *H04N 9/07* | (2006.01) |
| *H04N 13/207* | (2018.01) |
| *H04N 13/254* | (2018.01) |
| *H04N 9/04* | (2006.01) |
| *H04N 13/257* | (2018.01) |

(52) U.S. Cl.
CPC ........... *H04N 13/207* (2018.05); *H04N 9/045* (2013.01); *H04N 13/254* (2018.05); *H04N 13/257* (2018.05); *H04N 2209/045* (2013.01)

(58) Field of Classification Search
CPC .................................................. H04N 13/025
USPC .......................................................... 348/46
See application file for complete search history.

(56) References Cited

U.S. PATENT DOCUMENTS

| | | | | |
|---|---|---|---|---|
| 2008/0285056 | A1* | 11/2008 | Blayvas | G01B 11/2509 356/603 |
| 2009/0033760 | A1* | 2/2009 | Oh | H04N 5/23293 348/222.1 |

(Continued)

FOREIGN PATENT DOCUMENTS

| | | |
|---|---|---|
| CN | 103081484 A | 5/2013 |
| WO | 2013090922 A1 | 6/2013 |

OTHER PUBLICATIONS

Translation of the 2nd Office Action corresponding to Chinese Patent Application No. 201410311722.9, dated Jul. 6, 2016, 12 pages.

(Continued)

*Primary Examiner* — Gims S Philippe
*Assistant Examiner* — Mainul Hasan
(74) *Attorney, Agent, or Firm* — Lathrop Gage LLP

(57) ABSTRACT

An imaging system and method for generating a three-dimensional color image include an opening for allowing light from an object to enter the imaging system. Each sensor element in an array of sensor elements receives a portion of the light and generates a signal indicative of an intensity of the received portion of the light. Light from an optical element impinges on a filter comprising a plurality of filter regions, each filter region passes a predetermined band of wavelengths of the light and is associated with and disposed in alignment with one of the sensor elements such that light passing through each filter region impinges on the sensor associated and in alignment with the filter element. At least one of the filter regions is constructed to pass a visible color band, and at least one other of the filter regions is constructed to pass an infrared band.

18 Claims, 6 Drawing Sheets

(56) References Cited

U.S. PATENT DOCUMENTS

| | | | | |
|---|---|---|---|---|
| 2010/0141812 A1* | 6/2010 | Hirota | ............... | H04N 9/045 |
| | | | | 348/279 |
| 2010/0265316 A1* | 10/2010 | Sali | ............... | H04N 13/254 |
| | | | | 348/46 |
| 2011/0249157 A1* | 10/2011 | Fredembach | ..... | H01L 27/14621 |
| | | | | 348/273 |
| 2012/0056988 A1 | 3/2012 | Stanhill et al. | | |
| 2013/0329053 A1* | 12/2013 | Jones | ............... | H04N 9/735 |
| | | | | 348/164 |

OTHER PUBLICATIONS

English Translation of the First Office Action for Chinese Application No. 201410311722.9, dated Jan. 5, 2016, 11 pages.
English Translation of the Second Office Action for Taiwan Application No. 103121084 dated Mar. 9, 2016, 4 pages.
Fourth Office Action corresponding to Chinese Patent Application No. 201410311722.9, dated Jun. 26, 2017.
Taiwanese Application 103121084 Office Action and translation dated Jun. 26, 2015, 11 pages.
Translation of the 3rd Office Action corresponding to Chinese Patent Application No. 201410311722.9, dated Jan. 10, 2017, 10 pages.

* cited by examiner

142a

| B | IR | G | IR | B | IR | G | IR |
|---|---|---|---|---|---|---|---|
| IR | B | IR | G | IR | B | IR | G |
| G | IR | R | IR | G | IR | R | IR |
| IR | G | IR | R | IR | G | IR | R |
| B | IR | G | IR | B | IR | G | IR |
| IR | B | IR | G | IR | B | IR | G |
| G | IR | R | IR | G | IR | R | IR |
| IR | G | IR | R | IR | G | IR | R |

| B | G | IR | G | B | G | IR | G |
|---|---|---|---|---|---|---|---|
| G | B | G | IR | G | B | G | IR |
| IR | G | R | G | IR | G | R | G |
| G | IR | G | R | G | IR | G | R |
| B | G | IR | G | B | G | IR | G |
| G | B | G | IR | G | B | G | IR |
| IR | G | R | G | IR | G | R | G |
| G | IR | G | R | G | IR | G | R |

*FIG. 4B*

MULTI-BAND IMAGE SENSOR FOR PROVIDING THREE-DIMENSIONAL COLOR IMAGES

BACKGROUND

1. Technical Field

This disclosure related to image sensors, and, more particularly, image sensors used in generating three-dimensional color images.

2. Discussion of the Related Art

Current conventional systems that generate color three-dimensional images, such as three-dimensional game gesture camera systems, typically use two cameras. The cameras can include a color camera for processing color image data and an infrared (IR) camera for processing three-dimensional depth information. The use of multiple cameras in such applications can increase the size and cost of the host system.

SUMMARY

According to one aspect, a method for generating a three-dimensional color image is provided. The method includes: receiving light from an object through an opening; receiving the light from the opening at an array of sensor elements, each sensor element in the array of sensor elements receiving a portion of the light and generating a signal indicative of an intensity of the received portion of the light; and disposing a filter between the optical element and the array of sensor elements such that the light from the optical element impinges on the filter, the filter comprising a plurality of filter regions, each filter region being constructed to pass a predetermined band of wavelengths of the light, each filter region being associated with and disposed in alignment with one of the sensor elements such that light passing through each filter region impinges on the sensor associated and in alignment with the filter element. The band of wavelengths that at least one of the filter regions is constructed to pass is a visible color band, and the band of wavelengths that at least one other of the filter regions is constructed to pass is an infrared band.

According to another aspect, an imaging system for generating a three-dimensional color image is provided. The imaging system includes and imager for generating data for the three-dimensional color image and back-end processing circuitry coupled to the imager for receiving data frames from the imager and generating the three-dimensional color image from the data frames. The imager includes: an opening for allowing light from an object to enter the imaging system; an array of sensor elements for receiving the light from the opening, each sensor element in the array of sensor elements receiving a portion of the light and generating a signal indicative of an intensity of the received portion of the light; a filter between the optical element and the array of sensor elements such that the light from the optical element impinges on the filter, the filter comprising a plurality of filter regions, each filter region being constructed to pass a predetermined band of wavelengths of the light, each filter region being associated with and disposed in alignment with one of the sensor elements such that light passing through each filter region impinges on the sensor associated and in alignment with the filter element; an image signal processor for receiving the signal from the array of sensor elements and generating the data frames, i.e., frames of image data; and a state machine disposed within the imager for storing a plurality of groups of control settings, the state machine controlling the image signal processor and the array of sensor elements such that each data frame is generated in accordance with one of the groups of control settings applied by the state machine.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the inventive concept.

FIG. 4A includes a schematic diagram illustrating an exemplary RGB-IR filter array, which can be disposed in registration/alignment with a sensor array, as illustrated in FIG. 3, according to some exemplary embodiments.

FIG. 4B includes a schematic diagram illustrating another exemplary RGB-IR filter array, which can be disposed in registration/alignment with a sensor array, as illustrated in FIG. 3, according to some exemplary embodiments.

DETAILED DESCRIPTION

Figure 1:
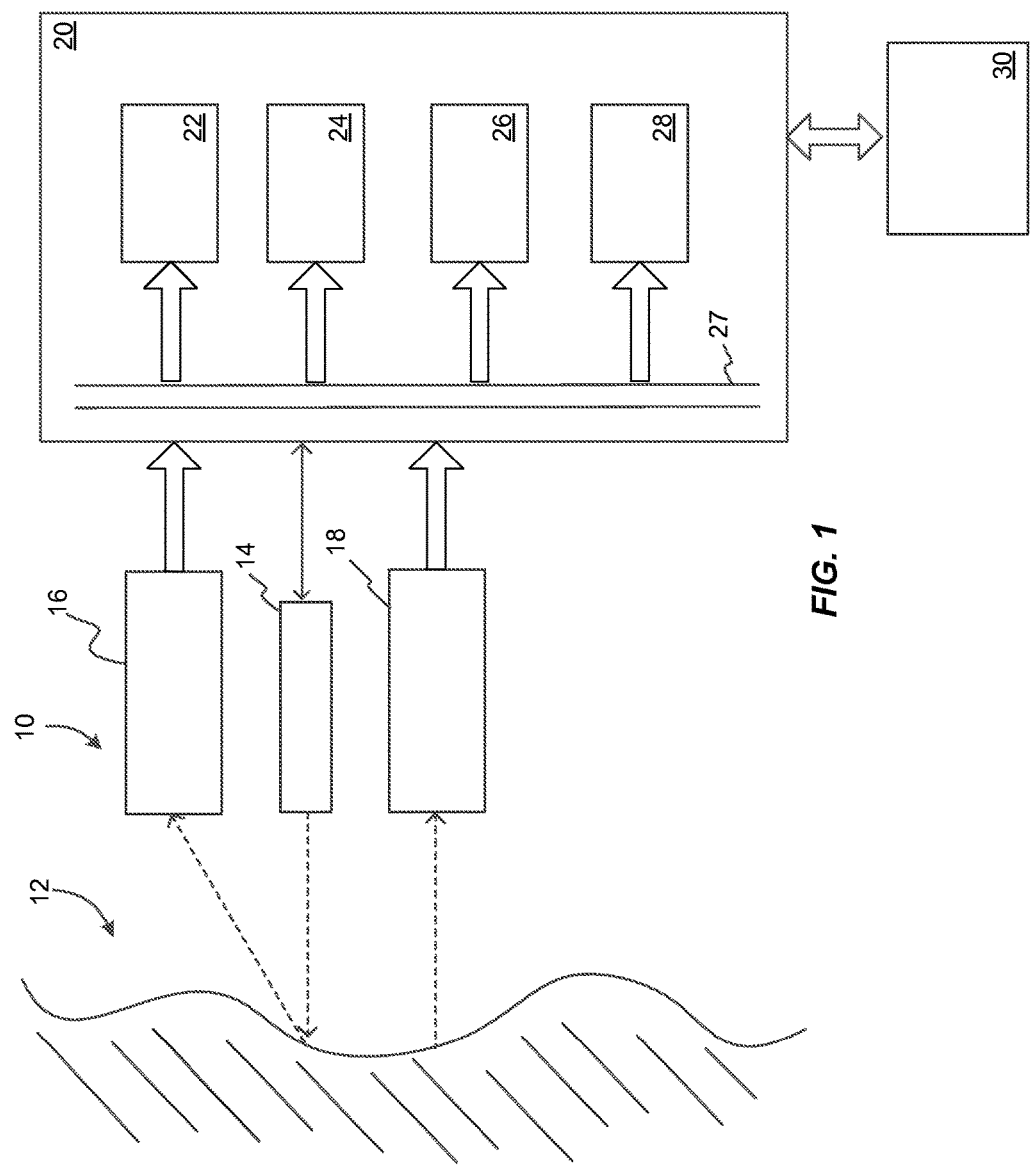
FIG. 1 includes a schematic block diagram of a conventional imaging system for generating a three-dimensional color image of an object or scene.

FIG. 1 includes a schematic block diagram of a conventional imaging system 10 for generating a three-dimensional color image of an object or scene 12. Imaging system 10 can be used, for example, as part of a camera for a three-dimensional gesture recognitions system, such as those used in common video game systems. Referring to FIG. 1, imaging system 10 includes an optical imager or camera 18, which receives and processes visible light from object or scene 12. Camera 18 typically produces red (R), green (G) and blue (B) color image data of object or scene 12 and is also referred to herein as an "RGB camera." Imaging system 10 also includes a source 14 of infrared light ("IR source 14"), such as an IR laser, which illuminates object or scene 12 with IR light. An IR imager or camera 16 receives and processes IR light returning from object or scene 12 to generate IR image data for object or scene 12.

Frames of image data from both RGB camera 18 and IR camera 16 are transmitted by cameras 18 and 16 to image processing circuitry 20, which processes the received data to generate a three-dimensional color image of object or scene 12. Image processing circuitry 20 uses the data from RGB camera 18 to generate a color image and the data from IR camera 16 to provide depth information such that the three-dimensional image is generated.

Image processing circuitry 20 can include various devices and circuits which function to carry out the various processing tasks required by imaging system 10. These devices and circuits can include at least a processor or controller 22, one or more memory devices 24, one or more input/output (I/O) interface devices 26 and one or more other peripheral devices 28. These devices 22, 24, 26 and 28 can communicate with each other via a communication bus 27. The image data for the image generated by processing circuitry 20 can be forwarded to an external device 30, which can be, for example, one or more of a memory for storage of the image and a display for display of the image.

Thus, the conventional imaging system 10 of FIG. 1 includes a separate RGB camera 18 and IR camera 16 for generating a three-dimensional color image. Multiple cameras and multiple sets of data and control signal lines result in imaging system 10 having a large and complex form factor and relatively high cost.

Figure 2:
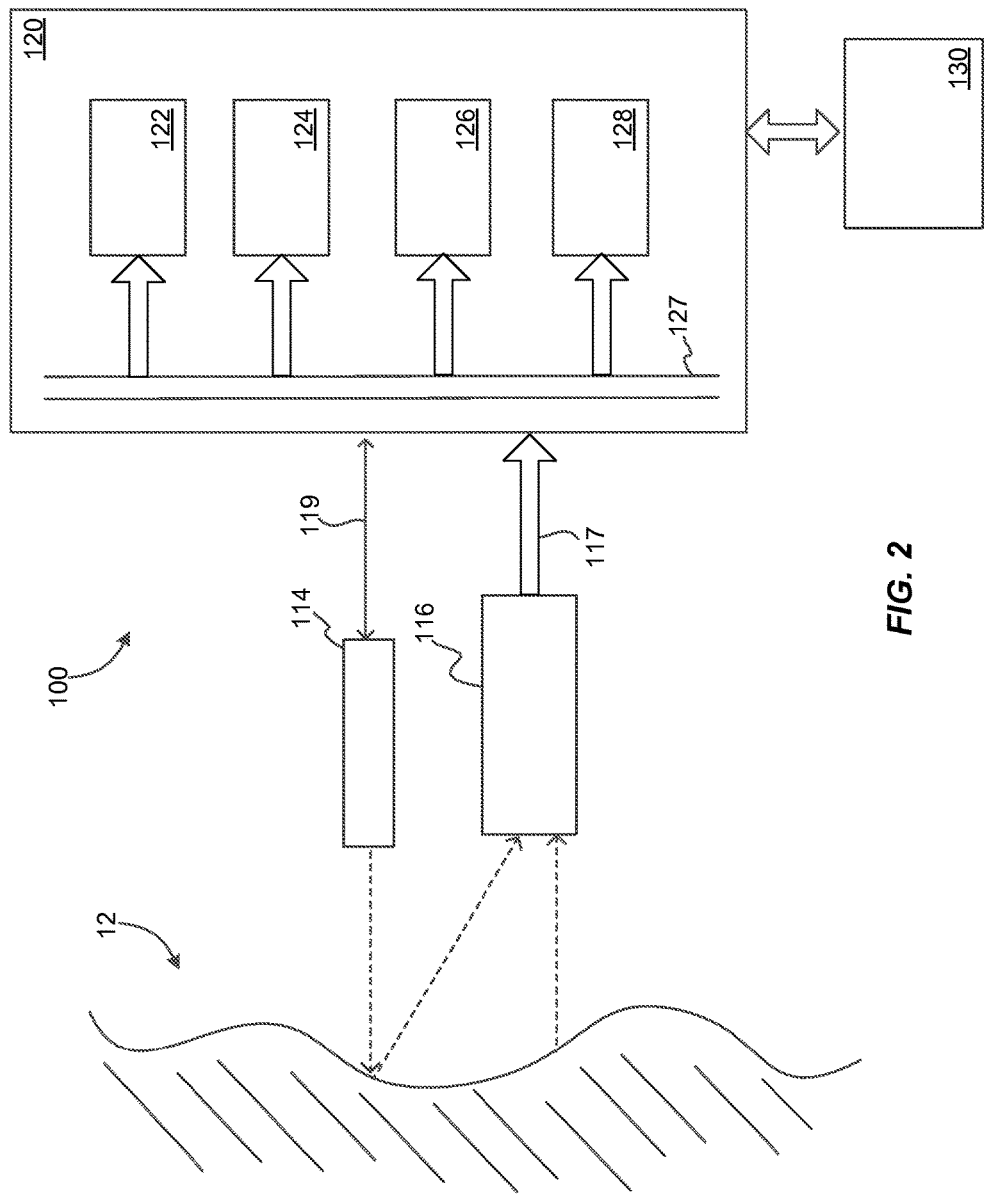
FIG. 2 includes a schematic block diagram of an imaging system for generating a three-dimensional color image of an object or scene, according to some exemplary embodiments.

FIG. 2 includes a schematic block diagram of an imaging system 100 for generating a three-dimensional color image of an object or scene 12, according to some exemplary embodiments. Imaging system 100 can be used, for example, as part of a camera for a three-dimensional gesture recognitions system, such as those used in common video game systems. Referring to FIG. 2, imaging system 100 includes a source 114 of infrared light ("IR source 114"), such as an IR laser, which illuminates object or scene 12 with IR light. Imaging system 100 also includes an imager or camera 116, which receives and processes both visible light and IR light from object or scene 12. Camera 116 produces red (R), green (G) and blue (B) color image data of object or scene 12 and also generates IR image data for object or scene 12. Accordingly, camera 116 is referred to herein as a "RGB-IR camera."

Frames of both color image data and IR image data are transmitted by RGB-IR camera 116 via control and data lines 117 to back-end image processing circuitry 120, which processes the received data to generate a three-dimensional color image of object or scene 12. Back-end image processing circuitry 120 uses the RGB data from RGB-IR camera 116 to generate a color image and the IR data from RGB-IR camera 116 to provide depth information such that the three-dimensional image is generated. Back-end image processing circuitry 120 also controls activation of IR source 114 via control lines 119. By controlling when IR source is active, image processing circuitry can ensure that color image data can be collected from object or scene 12 when IR source 114 is not active, such that IR light does not adversely affect the color image being generated. It may be difficult and inefficient for back-end image processing circuitry 120 to control IR source 114.

Back-end image processing circuitry 120 can include various devices and circuits which function to carry out the various processing tasks required by imaging system 100. These devices and circuits can include at least a processor or controller 122, one or more memory devices 124, one or more input/output (I/O) interface devices 126 and one or more other peripheral devices 128. These devices 122, 124, 126 and 128 can communicate with each other via a communication bus 127. The image data for the image generated by back-end image processing circuitry 120 can be forwarded to an external device 130, which can be, for example, one or more of a memory for storage of the image and a display for display of the image.

Figure 3:
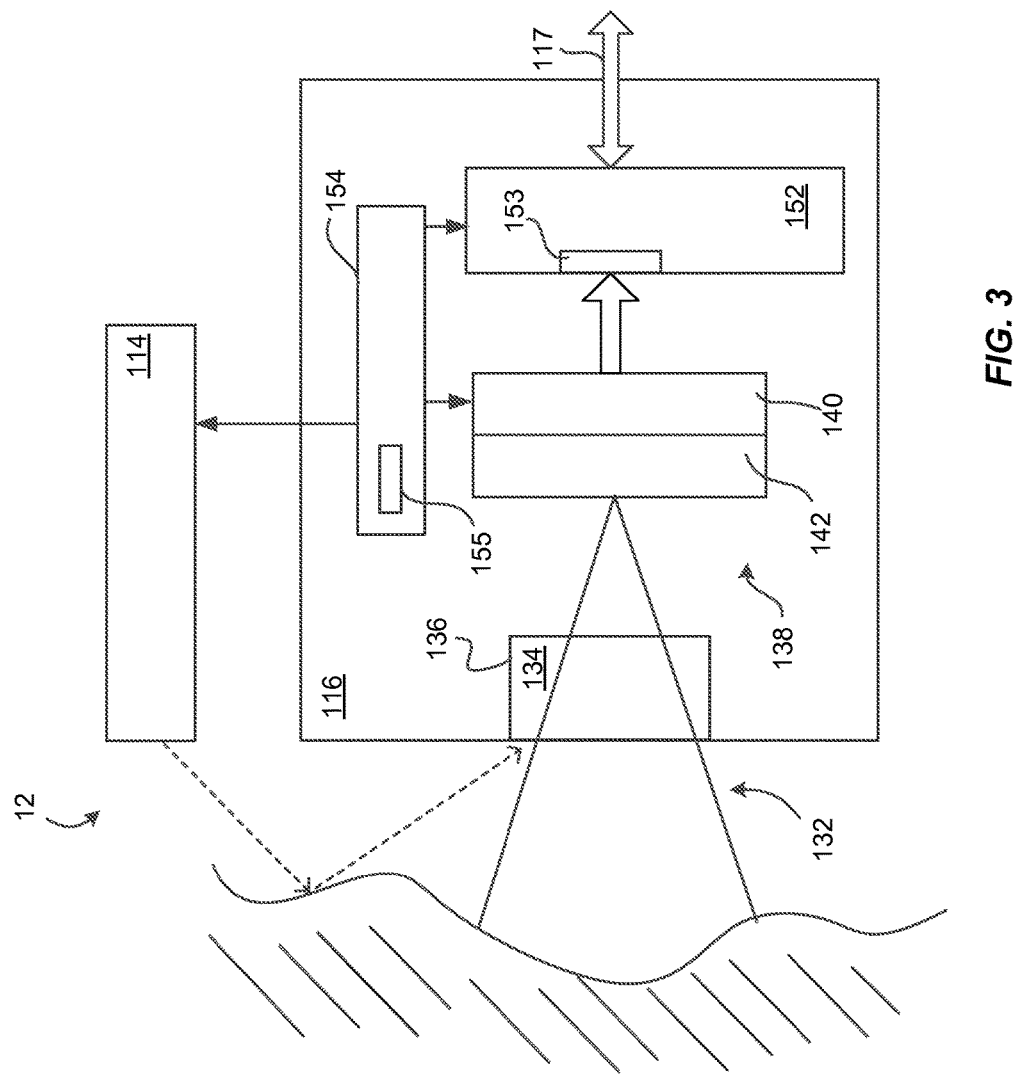
FIG. 3 includes a schematic block diagram of an RGB-IR camera illustrated in FIG. 2, according to some exemplary embodiments.

FIG. 3 includes a schematic block diagram of an RGB-IR camera 116 illustrated in FIG. 2, according to some exemplary embodiments. Referring to FIG. 3, RGB-IR camera 116 according to exemplary embodiments includes an opening or aperture 134 through which light 132 from object or scene 12 enters RGB-IR camera 116. A lens 136 receives the light and focuses the light on an RGB-IR sensor assembly 138. RGB-IR sensor assembly 138 includes a two-dimensional sensor array 140 (referred to hereinafter as "sensor array 140"), which includes a plurality of sensor elements arranged in a two-dimensional array. Each sensor of sensor array 140 receives light and generates an electrical signal indicative of the intensity of the light received by the sensor. An RGB-IR filter array 142 is disposed between lens 136 and sensor array 140. RGB-IR filter array 142 includes a plurality of filter portions arranged in a two-dimensional array. Each of the filter portions of RGB-IR filter array 142 is associated with and disposed in registration/alignment with one of the plurality of sensor elements in sensor array 140. Each filter portion filters its associated portion of the received light such that the associated sensor element of sensor array 140 generates an electrical signal indicative of intensity of light in the pass band of the filter portion.

An image signal processor (ISP) 152 receives the electrical signals from the sensor elements of sensor array 140 at readout circuitry 153 and generates digital data in the form of data frames for transmission via control and data lines 117 to back-end image processing circuitry 120 described above in connection with FIG. 2. According to exemplary embodiments, ISP 152 can separate data received at readout circuitry 153 and format the data into individual color and IR data frames for transmission to back-end image processing circuitry 120.

A control circuit or state machine 154 controls the operation of RGB-IR camera 116. State machine 154 controls activation of IR source 114. By controlling when IR source 114 is active, state machine 154 of RGB-IR camera 116 can ensure that color image data can be collected from object or scene 12 when IR source 114 is not active, such that IR light does not adversely affect the color image being generated. State machine 154 also interfaces with ISP 152 via control signals used to control the timing of the transmission of the color and IR data to back-end image processing circuitry 120.

State machine 154 also interfaces with sensor array 140 to control various parameters of the data generated by sensor array 140 and formatted and transmitted to back-end image processing circuitry 120 by ISP 152. For example, in some exemplary embodiments, state machine may include one or more storage devices 155, e.g., registers, which store parameters related to image data for sensor array 140. In some exemplary embodiments, these parameters stored by registers 155 can include, for example, an analog gain parameter, an exposure time parameter, and an image size parameter, which can be used in setting the frame rate for transmission of data frames.

ISP 152, under the control of state machine 154, arranges the RGB and IR data in data frames. The data frames are transmitted to back-end image processing circuitry 120 via control and data lines 117. Timing signals associated with the frames of data, such as, for example, sync and strobe signals, are also transmitted synchronously with the data signals from ISP 152 to back-end image processing circuitry 120 via control and data lines 117.

In some exemplary embodiments, ISP 152 generates the separate color and IR data frames, and, therefore, splits the pixel data into the separate data frames, according to a predefined processing approach. For example, in some exemplary embodiments, ISP 152 removes data components from different groups. For example, the color data frame can be processed, i.e., generated, by removing the IR component from IR elements by the following formula.

Color IMG=RGB IMG−r1*IR IMG r1=f(AWB,AvgIR), where r1 is a ratio between RGB and IR pixels, and r1≤1.0.

FIG. 4A includes a schematic diagram illustrating an exemplary RGB-IR filter array 142a, which can be disposed in registration/alignment with sensor array 140, as illustrated in FIG. 3, according to some exemplary embodiments. FIG. 4B includes a schematic diagram illustrating another exemplary RGB-IR filter array 142b, which can be disposed in registration/alignment with sensor array 140, as illustrated in FIG. 3, according to some exemplary embodiments. In some exemplary embodiments, each pixel of sensor array 140 includes four filter portions of RGB-IR filter array 142 and four sensor elements of sensor array 140. Referring to FIGS. 4A and 4B, as described above, RGB-IR filter arrays 142a and 142b include a plurality of both color and IR filter portions, arrange in two-dimensional arrays. These arrays illustrate the filtered sensor element data from the pixels of sensor array 140, each pixel being defined by data from four corresponding sensor elements of sensor array 140. The pixel data for each data frame is generated by ISP 152.

In some particular exemplary embodiments, each instance of data from sensor array 140 is split into two data frames, wherein one of the data frames is an RGB (color) data frame, and the other data frame is an IR data frame. For each instance of RGB and IR data, the two data frames can be transmitted separately from ISP 152 of RGB-IR camera 116 to back-end image processing circuitry 120. In one particular exemplary embodiment, in order to realize this dual video stream, with one stream dedicated to color and the other dedicated to IR, a fast frame rate is used. For example, in some particular exemplary embodiments, a frame rate greater than approximately 60 frames per second (fps) is used. Also, a relatively high data transfer speed is used to implement the dual video stream. Also, according to some exemplary embodiments, state machine 154 includes internal group functions, for example, group A and group B, each being programmable to include independent group settings, which can be, for example, one or more of group number, frame number, exposure time, gain, image size, statics information, vertical total signals (VTS) used in setting frame rate, strobe timing, and other functions. To that end, each data stream generated and output by ISP 152 can include embedded tag information, which can include one or more of these items of information for the data frame, and which can synchronize the data frame image.

Figure 5:
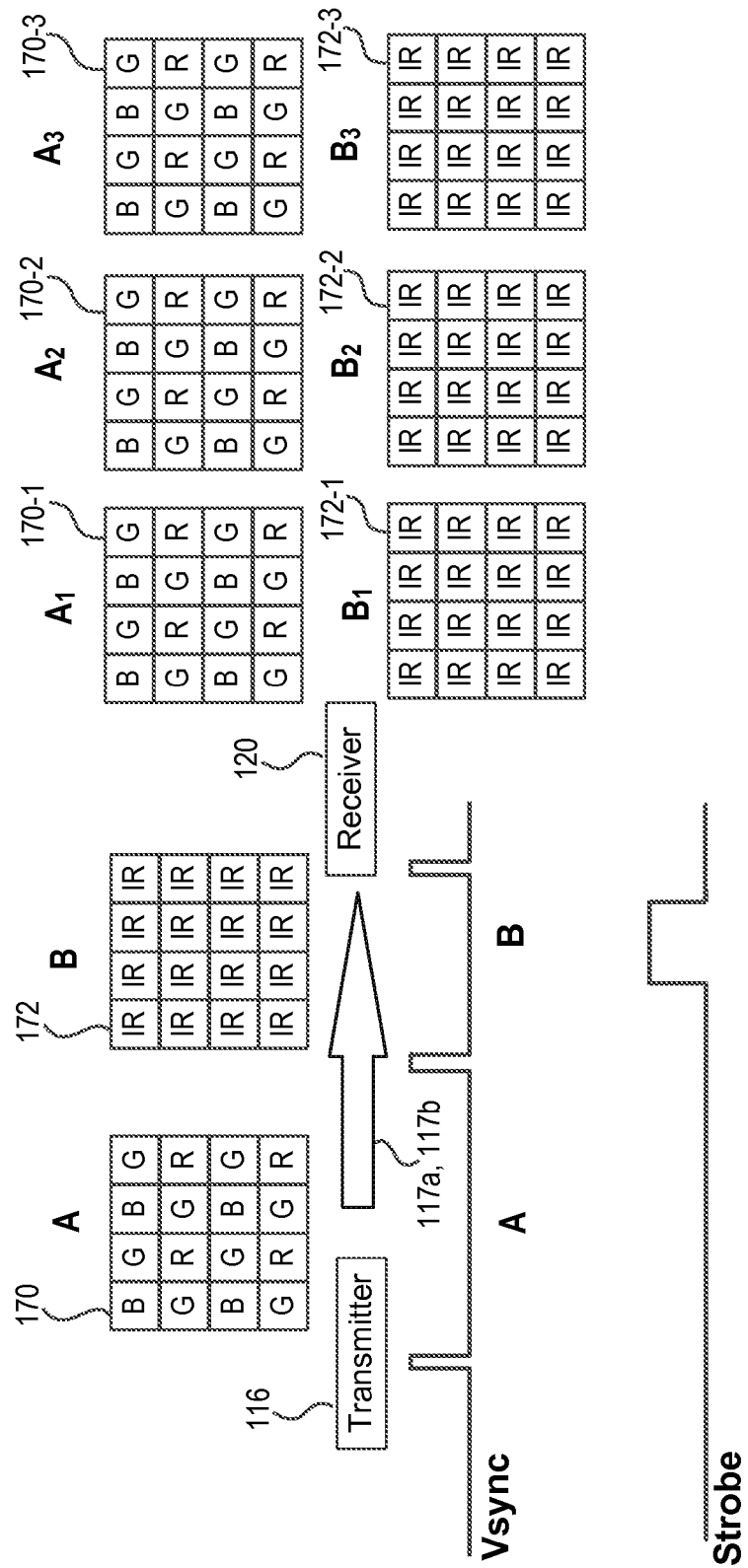
FIG. 5 includes a schematic diagram which illustrates the transfer of multiple data frames, including color data frames and IR data frames, over an interface between an RGB-IR camera and image processing circuitry, according to some exemplary embodiments.

FIG. 5 includes a schematic diagram which illustrates the transfer of multiple data frames, including color data frames and IR data frames, over an interface between RGB-IR camera 116 and back-end image processing circuitry 120, according to some exemplary embodiments. In FIG. 5, RGB-IR camera 116 is indicated as a transmitter of the data frames, and back-end image processing circuitry 120 is indicated as the receiver of the data frames.

Referring to FIG. 5, in some particular exemplary embodiments, color data frames are identified as even data frames and IR data frames are identified as odd data frames. In these embodiments, color data frames are transmitted in alternating fashion with the IR data frames. Referring to FIG. 5, in some exemplary embodiments, color data frame 170 and IR data frame 172 are generated using one of exemplary RGB-IR filter arrays 142a and 142b illustrated in FIGS. 4A and 4B, respectively, with each pixel of data being generated from corresponding two color RGB and two IR filter portions and four associated sensor elements. As illustrated in FIG. 5, by decoding the frame header, back-end image processing circuitry 120 may determine each instance of collected RGB and IR data, a color data frame 170 is transmitted in a first group in a first time period, indicated in FIG. 5 by "A," and an IR data frame 172 is transmitted in a second group in a second time period indicated in FIG. 5 by "B."

In addition to forwarding the color and data frames, timing signals Vsync and Strobe are also generated and transmitted to back-end image processing circuitry 120. These timing signals are also illustrated in FIG. 5. As illustrated in FIG. 5, the Vsync signal provides a synchronization pulse which indicates the end of a data frame and the beginning of the next data frame. The Strobe signal includes a pulse which is generated during the IR data collection period. This Strobe pulse is activated to indicate activation, i.e., turn-on, of IR source 114 (FIG. 2) to illuminate object or scene 12 with IR light, to ensure high-quality IR image data. As described above, state machine 154 controls activation of IR source 114. By controlling when IR source is active, state machine 154 can ensure that color image data can be collected from object or scene 12 when IR source 114 is not active, such that IR light does not adversely affect the color image being generated.

FIG. 5 also illustrates three pairs of received color and IR data frames for three exemplary data collection instances, numbered 1, 2 and 3. That is, the received color data frame 170-1 is received for group A of data collection instance 1, which is indicated by $A_1$; the received color data frame 170-2 is received for group A of data collection instance 2, which is indicated by $A_2$; and the received color data frame 170-3 is received for group A of data collection instance 3, which is indicated by $A_3$. Similarly, the received IR data frame 172-1 is received for group B of data collection instance 1, which is indicated by $B_1$; the received IR data frame 172-2 is received for group B of data collection instance 2, which is indicated by $B_2$; and the received IR data frame 172-3 is received for group B of data collection instance 3, which is indicated by $B_3$.

Imaging system 100 has been described in detail herein as using a dual sensor array and generating data frames for color (RGB) and IR data. It will be understood that any number of different data frames can be generated. For example, color data frames three-color RGB data frames can be generated. Also, data frames can be generated for each individual color, i.e., a red data frame, a green data frame, a blue data frame and an IR data frame. Any such variation in number and type of data frames is within the scope of this detailed description.

Figure 6:
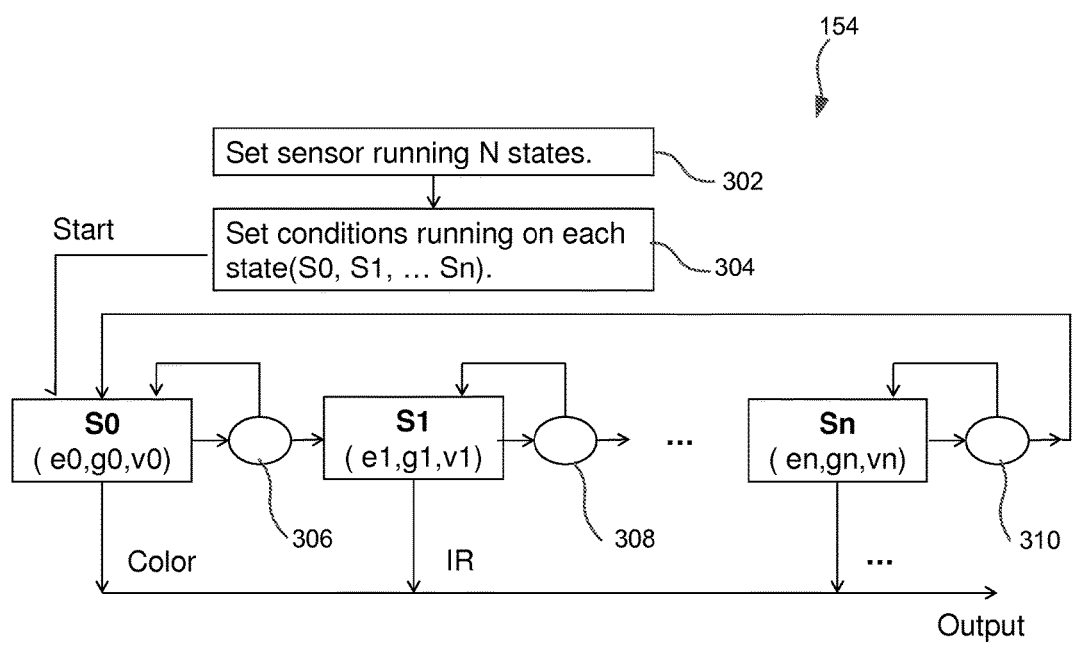
FIG. 6 includes a state diagram which illustrates that the imaging system of the disclosure can process any number n of data frames, according to some exemplary embodiments.

FIG. 6 includes a state diagram which illustrates operation of state machine 154, illustrated in FIG. 3. FIG. 6 illustrates that imaging system 100 can process any number n of different data frame types, according to some exemplary embodiments. The n data frame types correspond to n states, identified in FIG. 6 as S0, S1, . . . , Sn Referring to FIG. 6, each state S0, S1, . . . , Sn is associated with a data frame type. For example, state S0 is associated with an RGB (color) data frame type, state S1 is associated with an IR data frame type, etc. Each state is also associated with a parameter group. For example, each state can be associated with an exposure time parameter e, an analog gain parameter g and a vertical blanking interval parameter v, which determines the transmission frame rate.

Referring to FIG. 6, according to the process of exemplary embodiments, sensor array 142 is set running in a predetermined number N of maximum states, as illustrated in 302. Next, conditions running on each state are set in step 304. For example, parameters (e0, g0, v0) are set for state S0; parameters (e1, g1, v1) are set for state S1; parameters (en, gn, vn) are set for state Sn, etc. State machine 154 remains in its present state or advances to its next state through condition transfer blocks indicated by 306, 308 and 310 in FIG. 6. Condition transfer blocks 306, 308 and 310 determine the number of times each of states S0, S1 and Sn is repeated before advancing to the next state.

According to the exemplary embodiments, state machine 154 in RGB-IR camera 116 can be fabricated locally "on-chip" with sensor array 142. The control provided by state machine 154 by the transfer of the sensor array control parameter groups described in detail above is carried out locally within RGB-IR camera 116 and on-chip with sensor array 142. Also, control of the ON and OFF states of IR source 114 is controlled locally by state machine 154. These functions need not be performed remotely by back-end signal processing circuitry 120. As a result, the form factor of system 100 is simplified. Also, system 100 can operate at higher frame rates, allowing for the RGB and IR data streams to be transferred at high data rates, resulting in greatly improved system efficiency and image quality.

Combinations of Features

Various features of the present disclosure have been described above in detail. The disclosure covers any and all combinations of any number of the features described herein, unless the description specifically excludes a combination of features. The following examples illustrate some of the combinations of features contemplated and disclosed herein in accordance with this disclosure.

In any of the embodiments described in detail and/or claimed herein, the filter regions can comprise two patterns, a first pattern of the two patterns being a pattern of color filter regions and a second pattern of the two patterns being a pattern of infrared filter regions.

In any of the embodiments described in detail and/or claimed herein, the pattern of color filter regions can include red filter regions.

In any of the embodiments described in detail and/or claimed herein, the pattern of color filter regions can include blue filter regions.

In any of the embodiments described in detail and/or claimed herein, the pattern of color filter regions can include green filter regions.

In any of the embodiments described in detail and/or claimed herein, the band of wavelengths that at least one of the filter regions is constructed to pass is a visible color band, and the band of wavelengths that at least one other of the filter regions is constructed to pass is an infrared band.

In any of the embodiments described in detail and/or claimed herein, the data generated by the sensor elements associated with the color filter regions can be transferred to an image processor in a first series of data frames; and the data generated by the sensor elements associated with the infrared filter regions can be transferred to an image processor in a second series of data frames.

In any of the embodiments described in detail and/or claimed herein, each data frame of the first and second series of data frames can be generated in accordance with a group of control settings.

In any of the embodiments described in detail and/or claimed herein, each of the groups of control settings can include at least one of a gain setting, an exposure setting, a frame size setting and an IR source ON/OFF control setting.

In any of the embodiments described in detail and/or claimed herein, each data frame of the first and second series of data frames can be generated with a frame identification tag which identifies the data frame and a least one predetermined parameter associated with the data frame.

In any of the embodiments described in detail and/or claimed herein, the predetermined parameter can be at least one of frame number, color data identification, and IR data identification.

In any of the embodiments described in detail and/or claimed herein, the data frames of the first series of data frames can be transmitted to the image processor alternately with the data frames of the second series of data frames.

In any of the embodiments described in detail and/or claimed herein, the state machine is configured to operate in any number n of states.

In any of the embodiments described in detail and/or claimed herein, the imaging system can be part of a three-dimensional gesture recognition system.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A method for generating a three-dimensional color image, comprising:
   receiving light from an object through an aperture;
   receiving the light from the aperture at an array of sensor elements, each sensor element in the array of sensor elements receiving a portion of the light and generating a signal indicative of an intensity of the received portion of the light;
   transmitting a portion of the light through a filter array located between the aperture and the array of sensor elements, the filter array including a plurality rows and a plurality of columns of side-adjacent color filter regions, each of the plurality of rows and columns including a first infrared filter region and a second infrared filter region most proximate the first infrared filter region, the first and second infrared filter region being separated by two green filter regions and, therebetween, one of a blue filter region and a red filter region, wherein each red, green, blue, and infrared filter region is associated with and disposed in alignment with a respective one of the sensor elements such that light passing through the filter region impinges on the respective sensor element, and each red, blue, and infrared color filter region has four side-adjacent green color filter regions;
   receiving the signal from each sensor element of the array of sensor elements and generating frames of image data;
   storing a plurality of groups of control settings such that each frame of image data is generated in accordance with one of the groups of control settings; and
   receiving the frames of image data and generating the three-dimensional color image from the frames of image data.

2. The method of claim 1, the red, green, blue, and infrared filter regions of the filter array collectively forming a net pattern having, along a first direction:
   (i) a plurality of diagonally-aligned corner-adjacent infrared filter regions, (ii) a plurality of diagonally-aligned corner-adjacent green filter regions, and (iii) a plurality of diagonally-aligned corner-adjacent pairs of red filter regions alternating with, and collinear with, a plurality of diagonally-aligned corner-adjacent pairs of blue filter regions and along a second direction differing from the first direction, a plurality of diagonally-aligned corner-adjacent green filter regions.

3. The method of claim 2, wherein:

the data generated by the sensor elements associated with the red, green, and blue filter regions are transferred to back-end image processing circuitry in a first series of data frames; and the data generated by the sensor elements associated with the infrared filter regions are transferred to the back-end image processing circuitry in a second series of data frames.

4. The method of claim 3, wherein each data frame of the first and second series of data frames is generated in accordance with a group of control settings.

5. The method of claim 4, wherein each of the groups of control settings includes a frame size setting.

6. The method of claim 3, wherein each data frame of the first and second series of data frames is generated with a frame identification tag which identifies the data frame and at least one predetermined parameter associated with the data frame.

7. The method of claim 6, wherein the predetermined parameter is at least one of frame number, color data identification, and IR data identification.

8. The method of claim 3, wherein the data frames of the first series of data frames are transmitted to the back-end image processing circuitry alternately with the data frames of the second series of data frames.

9. An imaging system for generating a three-dimensional color image, comprising:

an imager for generating data for the three-dimensional color image, the imager comprising:

an aperture for allowing light from an object to enter the imaging system, an array of sensor elements for receiving the light from the aperture, each sensor element in the array of sensor elements receiving a portion of the light and generating a signal indicative of an intensity of the received portion of the light, a filter array between the aperture and the array of sensor elements such that the light from the aperture impinges on the filter array, the filter array including a plurality of rows and a plurality of columns of side-adjacent color filter regions, each of the plurality of rows and columns including a first infrared filter region and a second infrared filter region most proximate the first infrared filter region, the first and second infrared filter regions being separated by two green filter regions and, therebetween, one of a blue filter region and a red filter region, wherein each red, green, blue, and infrared filter region is associated with and disposed in alignment with a respective one of the sensor elements such that light passing through the filter region impinges on the respective sensor element, and each red, blue, and infrared color filter region has four side-adjacent green color filter regions, an image signal processor for receiving the signal from each sensor element of the array of sensor elements and generating frames of image data, and a control circuit disposed within the imager for storing a plurality of groups of control settings, the control circuit controlling the image signal processor and the array of sensor elements such that each frame of image data is generated in accordance with one of the groups of control settings applied by the control circuit; and back-end image processing circuitry coupled to the imager for receiving the frames of image data from the imager and generating the three-dimensional color image from the frames of image data.

10. The imaging system of claim 9, the red, green, blue, and infrared filter regions of the filter array collectively forming a net pattern having, along a first direction: (i) a plurality of diagonally-aligned corner-adjacent infrared filter regions, (ii) a plurality of diagonally-aligned corner-adjacent green filter regions, and (iii) a plurality of diagonally-aligned corner-adjacent pairs of red filter regions alternating with, and collinear with, a plurality of diagonally-aligned corner-adjacent pairs of blue filter regions and along a second direction differing from the first direction, a plurality of diagonally-aligned corner-adjacent green filter regions.

11. The imaging system of claim 9, wherein:

the data generated by the sensor elements associated with the red, green, and blue filter regions are transferred to the back-end image processing circuitry in a first series of data frames; and the data generated by the sensor elements associated with the infrared filter regions are transferred to the back-end image processing circuitry in a second series of data frames.

12. The imaging system of claim 11, wherein each data frame of the first and second series of data frames is generated in accordance with a group of control settings.

13. The imaging system of claim 12, wherein each of the groups of control settings includes a frame size setting.

14. The imaging system of claim 11, wherein each data frame of the first and second series of data frames is generated with a frame identification tag which identifies the data frame and a least one predetermined parameter associated with the data frame.

15. The imaging system of claim 14, wherein the predetermined parameter is at least one of frame number, color data identification, and IR data identification.

16. The imaging system of claim 11, wherein the data frames of the first series of data frames are transmitted to the back-end image processing circuitry alternately with the data frames of the second series of data frames.

17. The imaging system of claim 9, wherein the control circuit is configured to operate in at least three states.

18. The imaging system of claim 9, wherein the imaging system is part of a three-dimensional gesture recognition system.

\* \* \* \* \*